(12) United States Patent (10) Patent No.: US 7,134,080 B2
Kjeldsen et al. (45) Date of Patent: Nov. 7, 2006

(54) METHOD AND SYSTEM FOR A USER-FOLLOWING INTERFACE

(75) Inventors: Frederik Carl Moesgaard Kjeldsen, Poughkeepsie, NY (US); Anthony Levas, Yorktown Heights, NY (US); Gopal Sarma Pingali, Mohegan Lake, NY (US); Claudio Santos Pinhanez, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 10/226,426

(22) Filed: Aug. 23, 2002

(65) Prior Publication Data

US 2004/0036717 A1  Feb. 26, 2004

(51) Int. Cl.
*G06F 3/00* (2006.01)

(52) U.S. Cl. .................. 715/730; 715/848; 715/850

(58) Field of Classification Search .............. 353/69, 353/71, 89, 94, 48, 49, 42, 82, 28; 345/156–157, 345/419; 715/730, 848, 757, 761, 850, 849, 715/863, 731, 732; 348/208.14, 169, 207.1; 702/150, 152; 382/103
See application file for complete search history.

(56) References Cited

U.S. PATENT DOCUMENTS

| | | | | |
|---|---|---|---|---|
| 5,528,263 | A * | 6/1996 | Platzker et al. ............ | 345/156 |
| 6,283,860 | B1 * | 9/2001 | Lyons et al. ............... | 463/36 |
| 6,431,711 | B1 | 8/2002 | Pinhanez .................... | 353/69 |
| 6,520,647 | B1 * | 2/2003 | Raskar ........................ | 353/70 |
| 6,616,284 | B1 * | 9/2003 | Yaniv et al. ................ | 353/79 |
| 6,728,632 | B1 * | 4/2004 | Medl .......................... | 701/207 |
| 6,804,406 | B1 * | 10/2004 | Chen .......................... | 382/254 |
| 6,840,625 | B1 * | 1/2005 | Koyama et al. ............. | 353/31 |
| 6,931,596 | B1 * | 8/2005 | Gutta et al. ................. | 715/728 |
| 6,982,697 | B1 * | 1/2006 | Wilson et al. .............. | 345/156 |
| 7,006,055 | B1 * | 2/2006 | Sukthankar et al. ......... | 345/1.2 |
| 2001/0024231 | A1 * | 9/2001 | Nakamura et al. ........... | 348/58 |
| 2001/0029011 | A1 * | 10/2001 | Dagani et al. ............... | 434/11 |
| 2002/0158873 | A1 * | 10/2002 | Williamson ................. | 345/427 |
| 2002/0186236 | A1 * | 12/2002 | Brown et al. ............... | 345/730 |
| 2004/0104935 | A1 * | 6/2004 | Williamson et al. ......... | 345/757 |

OTHER PUBLICATIONS

U.S. Appl. No. 60/264,604.*
Shafer et al., "The Easy Living Intelligent Environment System," Proc. of the CHI Workshop on Research Directions in Situated Computing (2000).
Sukthankar et al., "Smarter Presentations: Exploiting Homography in Camera-Projector Systems," Proc. of Inter'l Conference on Computer Vision (2001).
Welch et al., "Projected Imagery in Your 'Office of the Future',"IEEE Computer Graphics and Apps, 62-67 (2000).

* cited by examiner

*Primary Examiner*—Tadesse Hailu
*Assistant Examiner*—Blaine Basom
(74) *Attorney, Agent, or Firm*—Ryan, Mason & Lewis, LLP; Daniel P. Morris, Esq.

(57) ABSTRACT

Techniques are disclosed for projecting an image onto a surface suitable for interaction with a user while avoiding user occlusion, and while correcting for distortion due to oblique projection. The displayed image moves to a suitable surface at a suitable size and orientation as a user moves around an environment, resulting in a user-following interface. Surfaces are selected in which the projected interface is not occluded by the user or other objects in the environment. Displayed images may be interactive, and moved into an interaction area on a suitable surface that is convenient for the user. The interaction area may or may not coincide with the display area. Adaptation of the projected interface is allowed so that the content of the display and the style of interaction widgets are modified based on distance from the user and orientation of the user with respect to a projected interface.

28 Claims, 12 Drawing Sheets

METHOD AND SYSTEM FOR A USER-FOLLOWING INTERFACE

FIELD OF THE INVENTION

The present invention relates to video projection and sensing systems and, more particularly, relates to projecting and sensing techniques that automatically move and adapt a projected interface based on a location of a user in an environment.

BACKGROUND OF THE INVENTION

Today, people are very dependent on display devices, which serve as sources of information and entertainment during daily activities. In many offices, people spend hours sitting in front of a monitor. At home, people sit in front of a television. People are forced to go to where the display device is in order to interact with the display device. Additionally, "interaction" with a display device is very rudimentary, even today. For instance, some display devices offer interaction through a remote control, and others offer tactile interaction. However, there are very few display devices that offer direct interaction with an image produced by the display device.

It would be beneficial to provide more interaction between people and display devices. There are systems involving multiple projectors for realizing large-scale displays. Such systems are discussed in Welch et al., "Projected Imagery in Your Office of the Future," IEEE Computer Graphics and Apps, 62–67 (2000) and Sukthankar et al., "Smarter Presentations: Exploiting Homography in Camera-Projector Systems," Proc. of Int'l Conf. on Computer Vision, Vancouver, Canada (2001), the disclosures of which are hereby incorporated by reference. However, the projected images cannot be moved by these systems. Additionally, Shafer et al., "The Easy Living Intelligent Environment System," Proc. of the CHI Workshop on Research Directions in Situated Computing (2000), the disclosure of which is hereby incorporated by reference, discusses an environment in which cameras are used to track a person and a device close to a person is activated. However, this also does not allow interaction between a person and a display device.

Thus, what are needed are techniques that provide more human interaction with display devices.

SUMMARY OF THE INVENTION

The present invention solves the problems of the prior art by, in general, tracking users in an environment, and then providing information to a projector in order to create a projected interface on a suitable surface at a suitable position and, optionally, orientation. The suitability of the surfaces, positions, and orientations of the interface is determined by the position and, optionally, the orientation of a user in the environment. The projected interface comprises one or more displayed images, and generally comprises a display area and an interaction area. Thus, aspects of the present invention allow a user to interact with a display device.

Additionally, in aspects of the present invention, techniques are provided for automatically discovering areas for display and interaction and avoiding occlusion of the interface by, illustratively, performing geometric reasoning based on one or more models of projection, user position, and surfaces in the environment.

Moreover, aspects of the present invention allow adaptation of the content of the projected interface and the style and placement of the interaction "widgets" based on user position and orientation. An interaction widget is any portion of an image suitable for human interaction. Importantly, aspects of the present invention modify the projected interface so that it is convenient for interaction by being visible and reachable by the user. The invention can also, when necessary, separate the surfaces selected for display and interaction.

Thus, the present invention allows a projected interface to automatically appear close to the user on ordinary surfaces in an environment.

A more complete understanding of the present invention, as well as further features and advantages of the present invention, will be obtained by reference to the following detailed description and drawings.

DETAILED DESCRIPTION OF PREFERRED EMBODIMENTS

Figure 1A:
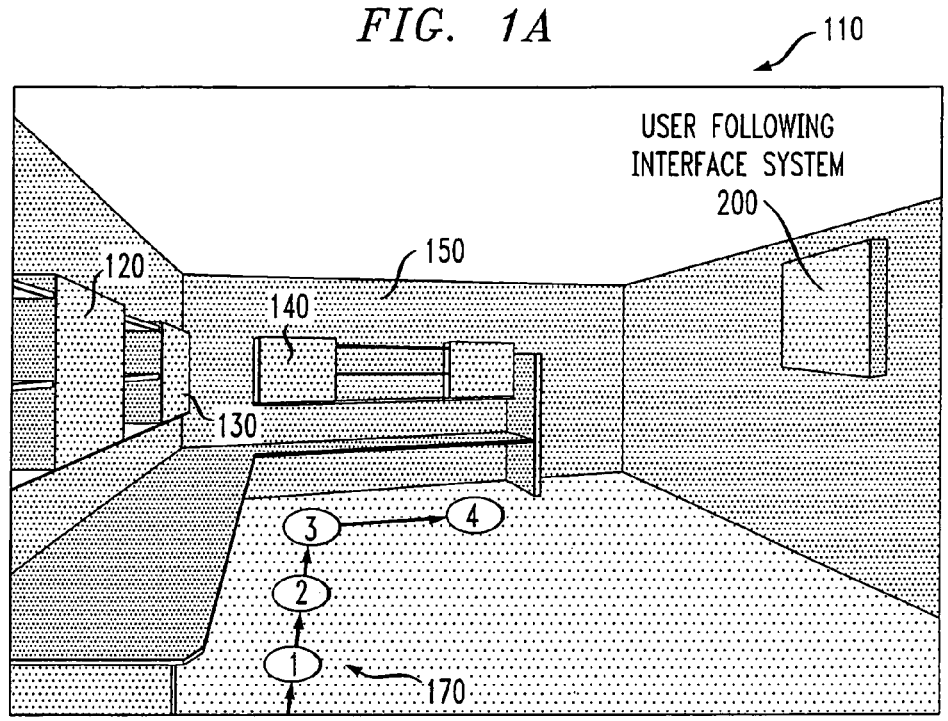
FIGS. 1A through 1E are illustrations of a user-following interface interacting with a user in an environment, in accordance with one embodiment of the present invention.

The present invention allows a user in an environment to interact with and be followed by displayed images. The images generally comprise an image on a display area and an image on an interaction area, where the display and interaction area may be separate areas, the same area, or overlapping areas. As a user moves around the environment, the present invention moves the displayed images to suitable surfaces. Generally, the suitable surfaces are chosen by proximity to the user and by orientation of the user. The images to be displayed are beneficially distorted so that the displayed images will be relatively undistorted from the perspective of the user. The user interacts with an image, and its interaction widgets, displayed on the interaction area. It should be noted that an interaction area may not have an image displayed on it. For example, a user could interact with a displayed image by moving his or her hand over a table. In this example, a display area contains a displayed image, but the interaction area does not. A steerable camera or other suitable device is used to view the movements by the user, but there is no displayed image on the interaction area. The present invention also may detect when a user occludes a displayed image, e.g., a display area or interaction area or both, and the present invention will move the displayed image to a different surface in order to prevent further occlusion.

Before proceeding with additional description of the present invention, it is beneficial to analyze conventional display techniques and their problems. As described above, people tend to have to go to a display device in order to interact with the display device. As discussed above, although it is beneficial for a displayed image to follow the users as they move and function in an environment, conventional techniques do not allow this. For instance, U.S. Pat. No. 6,431,711, entitled "Multiple-surface display projector with interactive input capability," issued to Claudio Pinhanez (2002) (hereinafter, "Pinhanez"), the disclosure of which is hereby incorporated by reference, teaches methods and apparatus for projecting an image onto any surface in a room and distorting the image before projection so that a projected version of the image will not be distorted. Pinhanez also teaches methods for allowing a person to interact with a projected image.

However, the multiple-surface display projector of Pinhanez does not have knowledge of the location of a user in an environment, nor of the three-dimensional geometry of the environment. Such a multiple-surface display projector has to be pre-calibrated to project on specific areas on specific surfaces in the environment and must be directed manually or programmatically to switch the displayed image from one pre-calibrated surface to the other. The projector of Pinhanez cannot automatically move the displayed image to the appropriate surface at the appropriate position, size and orientation based on the position and orientation of the user. The system cannot discover or define new areas used for displaying images and can only use the pre-calibrated areas.

Another problem with the multiple-surface display projector of Pinhanez, and with projection systems in general, is that they cannot detect when the user is occluding an image. These systems cannot change the position of the displayed image or adapt the content of the displayed image to compensate for user occlusion of the displayed image.

While the multiple-surface display projector of Pinhanez allows for user interaction with the projected image, Pinhanez does not provide ways for adapting the interaction interface based on the location of the user. Pinhanez also does not teach ways to specify an interface in application space and move the interface to arbitrary surfaces.

Thus, a user of a multiple-surface display projector system often faces several problems, such as the displayed image being in an inappropriate location at an inappropriate size and orientation, or the interaction widgets being too small or too large or unreachable, or the displayed image and/or the interaction widgets being occluded by the user or other objects in the environment.

What is provided by the present invention are techniques that solve these problems and that (i) automatically move a displayed image to an appropriate surface at an appropriate size and orientation based on the position and, optionally, orientation of a user; (ii) automatically detect and avoid occlusions; and (iii) automatically adapt the location of the interaction area and the content of the interaction interface based on the user location and available surfaces.

FIG. 1A is an illustration of user-following interface, in accordance with the present invention, interacting with a user in an environment. The figure shows an environment 110. The environment 110 comprises many surfaces and objects, and in particular, wall cabinets 120, 130, 140, and the wall 150. The environment also comprises a user-following interface system 200. Furthermore, there are also cameras and projectors (not shown for simplicity) that are generally used with user-following interface system 200. The environment 110 shows a path 170 taken by a user 190 as he moves in the environment 110. The path 170 particularly points out four positions marked as 1, 2, 3, and 4, which the user traverses as he travels along the path 170. The user-following interface system 200 will move an image on particular surfaces as the user traverses path 170.

Figure 1B:
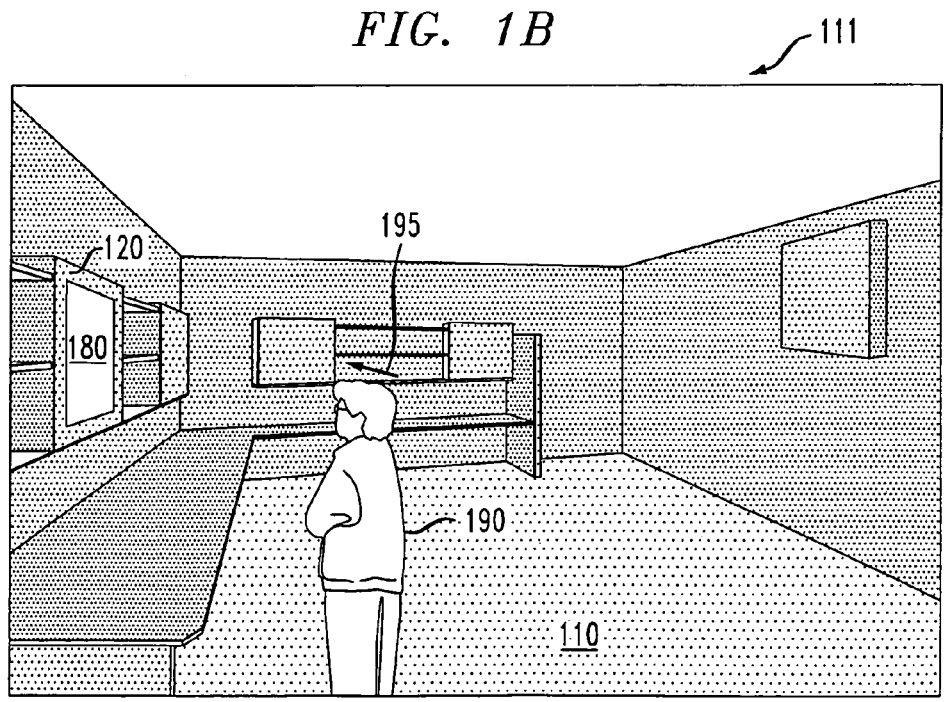
Figure 1C:
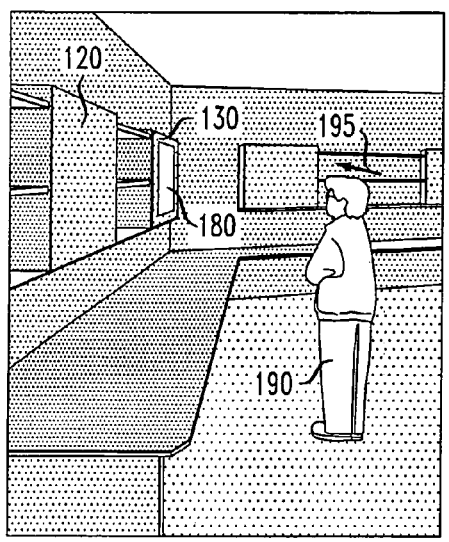
Figure 1D:
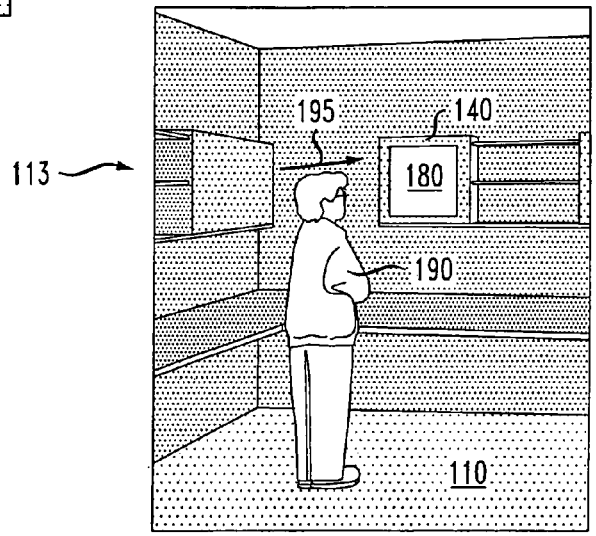
Figure 1E:
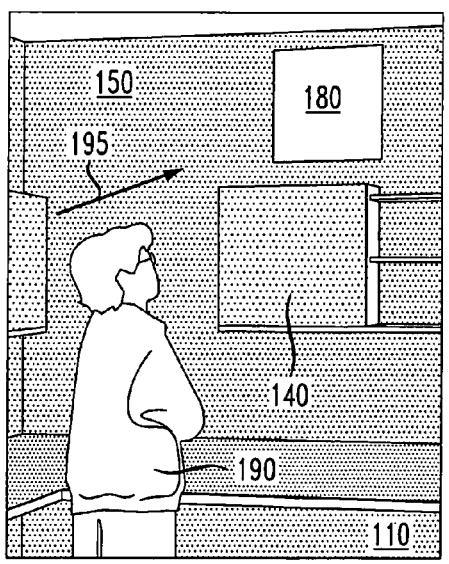

In particular, when the user is at position 1, as shown in FIG. 1B by portion 111 of environment 110, the user-following interface system 200 moves a displayed image 180 to the surface of wall cabinet 120. The position of the user is important to where the user-following interface system 200 moves the displayed image 180. Additionally, the orientation 195 of the user may be used to determine to which surface the image should be moved. This is described in more detail below. When the user moves to position 2, as shown in FIG. 1C by portion 112 of environment 110, the user-following interface system 200 moves the displayed image 180 to the cabinet 130, and moves the displayed image 180 to the cabinet 140 when the user moves to position 3, as shown in FIG. 1D by portion 113 of environment 110. When the user moves to position 4, as shown in FIG. 1E by portion 114 of environment 110, the user-following interface system 200 moves the displayed image 180 to the wall 150. Note that the user-following interface system 200 moves the image to an appropriate surface that is available and close to the user, that the size and orientation of the displayed image 180 can change, and that the displayed image 180 is positioned to avoid occlusion by the user or other objects in the environment. An occlusion is a blockage of the displayed image 180, such that a portion or all of the displayed image 180 is shaded by an object or user that intervenes between the projector and the displayed image 180.

Figure 2:
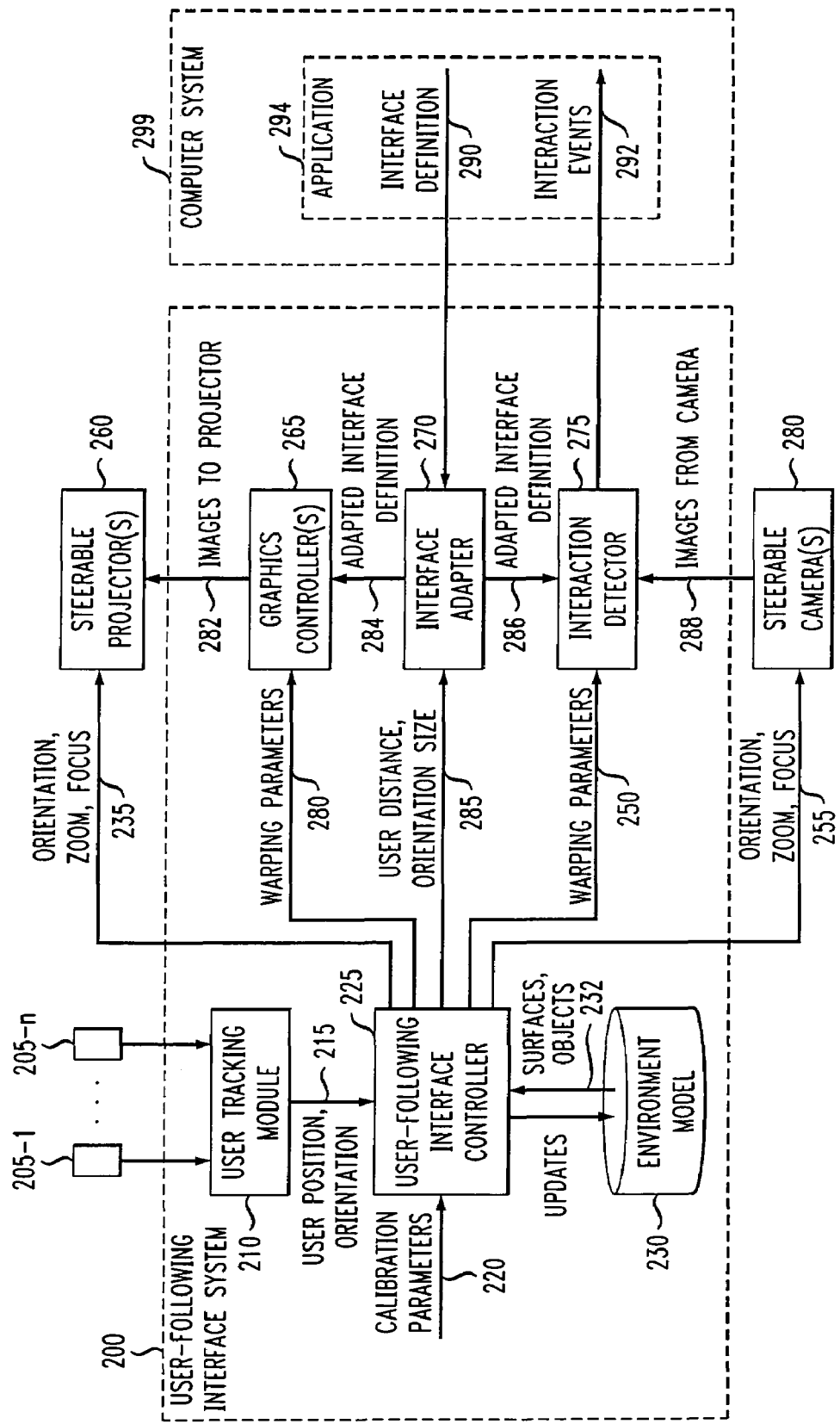
FIG. 2 is a block diagram of a user-following interface system and associated devices in accordance with one embodiment of the present invention.

FIG. 2 is a block diagram of an exemplary user-following interface system 200, shown interacting with a computer system 299, a steerable projector 260, multiple tracking devices 205-1 through 205-n (collectively, "tracking devices 205"), and a steerable camera 280, in accordance with one embodiment of the present invention. User-following interface system 200 comprises a user tracking module 210, a user-following interface controller 225, an environment model 230, a graphics controller 265, an interface adapter 270, and an interaction detector 275. Computer system 299 comprises application 294, which is coupled to the user-following interface system 200.

In this embodiment, multiple tracking devices 205 are used as means for determining user location and orientation in an environment. The tracking devices 205 can be cameras, electromagnetic devices, or active badges. For instance, Radio Frequency Identification (RFID) devices could be used as an electromagnetic device. There are a variety of active badges that may be worn by users and will transmit the location and sometimes orientation of the users. Some examples of such badges and systems are as follows. In an electromagnetic sensing system, a transmitting antenna in a fixed location generates axial direct current magnetic-field pulses. Receiving antennas are worn by the users. The system computes position and orientation of the receiving antennas by measuring the response in three orthogonal axes to the transmitted pulse, combined with the constant effect of the magnetic field of the earth. In a combined Radio Frequency (RF)/ultrasound system, users carry RF/ultrasound emitters, each of which sends a unique RF/ultrasound pulse on receiving a radio-frequency trigger signal. Receivers mounted on the ceiling also receive the trigger signal and the pulses from the emitters. The location of an emitter is estimated by the delay between arrival of the trigger signal and the emitted pulse at multiple receivers.

In the example of FIG. 2, cameras will be assumed to be used for tracking devices 205, but any device suitable for tracking a human may be used as a tracking device 205. The cameras 205 are input to a user tracking module 210 that analyzes images from cameras 205 to detect the presence of people in the environment observed by the cameras and that determines the position and, optionally, orientation of the detected people (called "users"). The user position and orientation parameters 215 are read by the user-following interface controller 225. The user-following interface controller 225 also has access to an environment model 230, which has a representation of the three-dimensional surfaces and objects in the environment (such as environment 210).

Figure 9:
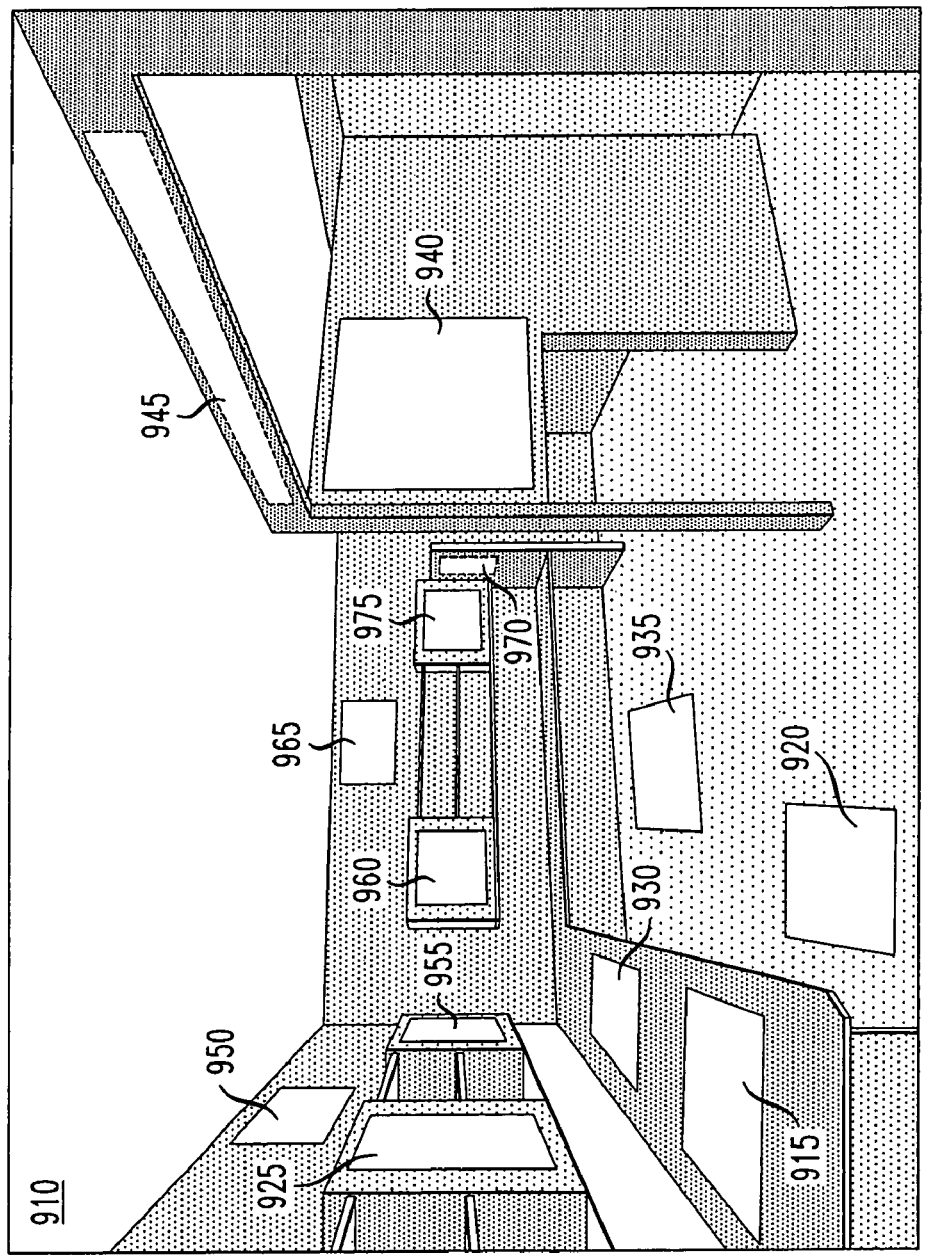
FIG. 9 is an illustration of a three-dimensional model of an environment with display areas overlaid, in accordance with one embodiment of the present invention.

The environment model 230 is beneficially built beforehand based on measurements made in the environment manually or through automated or semi-automated means. The user-following interface controller 225 queries the environment model 230 to obtain specific surfaces and objects in the environment model 230. The user-following interface controller 225 also provides updates on user location as well as defined display areas to the environment model 230. FIG. 9, described below, shows an example of a three-dimensional model of an environment with several defined display areas.

The user-following interface controller 225 also receives calibration parameters 220 for the various cameras 205 and 280 and for the steerable projector 260. These calibration parameters 220 give the three-dimensional position and orientation, as well as the zoom and focus parameters of the cameras and projectors. The user-following interface controller 225 performs geometric reasoning based on the user position and orientation parameters 215, calibration parameters 220, and the three-dimensional surface and object parameters 232. Based on this geometric reasoning, the user-following interface controller 225 determines where the interface should be displayed so that it is clearly visible to the user, is not occluded by the user or other objects in the environment, and is convenient for user interaction. It should be noted that there could be multiple users in the environment, but only one user might be using the interface.

The user-following interface system 200 of FIG. 2 employs a steerable projector 260 as a way to move the displayed image to the appropriate location based on the user position. In an embodiment, the steerable projector 260 consists of a combination of an Liquid Crystal Display (LCD) projector and a steerable mirror, as described in Pinhanez, already incorporated by reference above. However, any projector or projector system that can project onto multiple surfaces in an environment may be used. The projector-mirror combination of Pinhanez can project images onto different surfaces in an environment, thus creating a displayed image on any ordinary surface or object. However, when an image is projected onto a surface that is not orthogonal to both the axis of projection of the projector and the viewing direction of the user, the projected image appears distorted to the user. In order to eliminate this distortion, a graphics controller 265 pre-warps or pre-distorts the image to be projected such that it appears undistorted to the user. This is also described in Pinhanez.

Since a benefit of the user-following interface system 200 of FIG. 2 is to have an interface follow the user, the parameters 235 to the steerable projector 260, as well as the parameters 240 of the graphics controller 265, should be changed dynamically based on user position. The user-following interface controller 225 uses the aforementioned geometric reasoning to select a surface on which an image is to be displayed, and the size and orientation of the displayed image, depending on user location and orientation. The user-following interface controller 225 then determines the orientation, zoom, and focus parameters 235 for the steerable projector 260 to project the image onto the selected surface. The user-following interface controller 225 also determines the warping parameters 240 for the graphics controller 265 so that the image to be displayed is pre-distorted to appear at the appropriate orientation and size to the user.

Besides creating a displayed image on any surface in an environment based on user location, the user-following interface system 200 of FIG. 2 also provides for interaction with the displayed image so that the displayed image acts as an interactive interface to an application. In the present embodiment, the user interacts with projected images by means of hand gestures. These user interactions are detected by means of a steerable camera 280 and an interaction detector module 275. The camera 280 is steered to view the displayed image produced by the steerable projector 260. The images 288 from the camera 280 are analyzed by the interaction detector 275 to detect user interactions. Detected user interactions 292 are passed onto the application 294 to which the user-following interface system acts as the interface.

As the steerable camera 280 should continually view the displayed image for user interactions, the orientation, zoom, and focus parameters 255 of this camera also should be varied dynamically based on user position. Additionally, the interaction detector 275 should detect user interaction in different interaction areas or widgets in the displayed image. As the position, orientation, and size of the displayed image change dynamically, the appearance of the display contained in the camera images 288 changes dynamically, as well as the position, size, and orientation of the interaction widgets in the camera images 288. To enable detection of interaction by the interaction detector 275 in spite of these variations, the interaction detector is provided with warping parameters that can be used to map a representation of the widgets in a canonical orthogonal view to the view seen in the camera images 288 from the camera. The interaction detector 275 then performs analysis for interaction detection in the camera images 288.

Hence, appropriate orientation, zoom, and focus parameters 255 should be provided to the steerable camera 280 to keep the current displayed image in view, and warping parameters 250 should be provided to the interaction detector 250 to enable detection of interaction from the current image view. This is similar to providing orientation, zoom and focus parameters 235 to the steerable projector 260 and warping parameters 240 to the graphics controller 265. The user-following controller 225 determines the parameters 255, 250 along with the parameters 235, 240 based on the aforementioned geometric reasoning.

It should be noted that while the area for interaction by the user is typically the same as the display area, this need not, in general, be the case. The user-following interface system of FIG. 2 can position the display and interaction areas to be fully overlapping, partially overlapping, or non-overlapping. For example, when the user is too far from a displayed image, the system can provide an interaction area on a surface close to the user. User interactions on this surface then translate into selections and actions related to the displayed image. The user-following interface controller 225 determines the location of both display and interaction areas based on user position and accordingly specifies the parameters 235, 240, 250 and 255.

Finally, the content of the interface may also be varied based on the user position. For example, if the user is on the right of a large displayed image of a video player application, the interaction buttons such as "play" and "rewind" should be on the right hand side of the displayed image to be accessible by the user. On the other hand, if the user is on the left hand side, the buttons should also be on the left hand side. The number of buttons and the size of the text on a button may also have to be changed based on user position. The user-following interface system of FIG. 2 has an interface adapter module 270 that dynamically changes the actual interface content. The interface adapter 270 receives an interface definition 290 from the application 294. The interface definition 290 provides the interaction widgets and their canonical views and locations. These are generally application-specific. For example, these widgets may be "play," "pause," "forward," and "rewind" buttons in a video player application. The interface definition 290 may also include a set of alternate definitions that the interface adapter 270 can choose from. The interface adapter receives parameters 245 that specify the user distance from the displayed image, the orientation of the user with respect to the displayed image, and the size of the user's hand as seen in the camera images 288. These parameters 245 are provided to the interface adapter 270 by the user-following interface controller 225.

The interface adapter 270 modifies the interface definition based on these parameters. An adapted interface definition 284 is passed onto the graphics controller 265 and an adapted interface definition 286 is passed onto the interaction detector 275. The graphics controller 265 accordingly adapts the content of the projected image (such as position of buttons, and the text on buttons). The adapted interface definition 286 also determines where the interaction detector 275 should look for interactions in the camera images 288 and the specific interactions to look for.

It is to be appreciated that user-following interface system 200 can be implemented by one or more computers. For instance, the user-following interface system 200 can be implemented by computer system 299. A computer system generally comprises one or more processors and a memory. Additionally, the computer system may be coupled to a network and may receive programming or updates from the network. Instructions necessary for causing the computer system to carry out the steps required to perform the functions of user-following interface system 200 may be part of an article of manufacture, such as a compact disk. Additionally, all or part of user-following interface system 200 can be embodied in hardware, such as through a custom semiconductor chip. Furthermore, although user-following interface system 200 is shown as being one device, portions of the user-following interface system 200 can be separated from the system. For example, the user tracking module 210 could execute on one computer system, while the user-following interface controller 225 could execute on a second computer system, and the position and orientation 215 could be passed through a network connecting the two computer systems.

Furthermore, it should be appreciated that multiple steerable cameras 280 and steerable projectors 260, and any associated controllers or equipment, may be used in an implementation of the present invention. For instance, if it is desired that an interaction area comprise displayed images separate from displayed images in a display area, then it is beneficial to have two steerable projectors 260. One steerable projector 260 would be used to project the displayed images in the display area, and the second steerable projector 260 would be used to project the displayed images in the interaction area.

When there are multiple "users" in an environment, where a "user" is defined as a detected person, the user-following interface system 200 can select one or more of the users to be the person or persons being tracked. The selected person will also generally be selected as the person who will be using the interface. Optionally, the selected person could be input by the currently tracked user, so that the currently tracked user can inform the user-following interface system 200 as to which user is to be the new tracked user.

Figure 3:
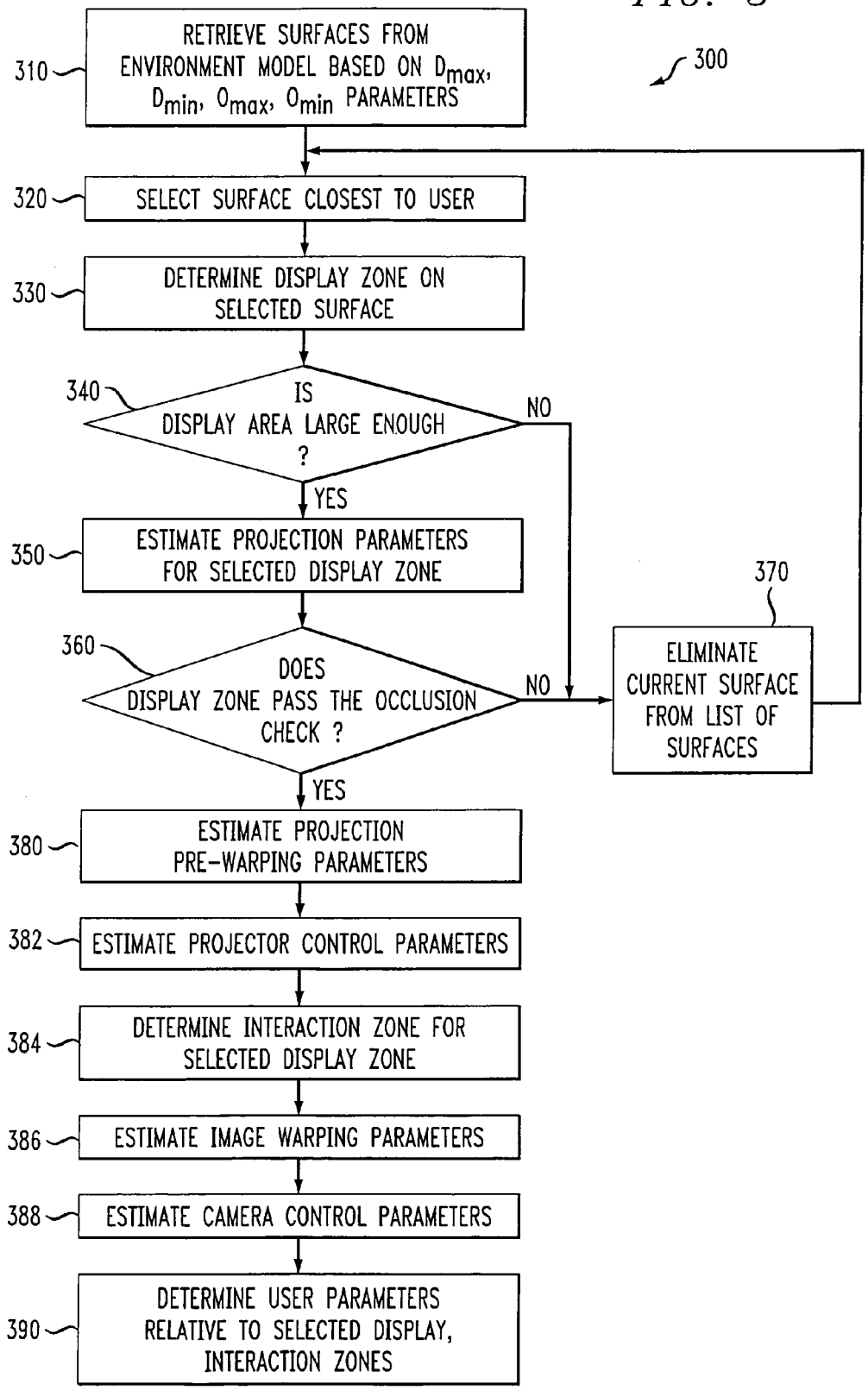
FIG. 3 is a flowchart of a method for tracking users and providing users with an interface, in accordance with one embodiment of the present invention.

FIG. 3 shows a flowchart of a method 300 generally executed by, for instance, the user-following interface controller 225 from FIG. 2. Reference to FIG. 2 is beneficial. Method 300 is a method to determine control parameters provided to the steerable cameras and projectors in the system. The user-following interface controller 225 receives the current user position and orientation parameters 215 from the user tracking module 210. Then in step 310, the user-following interface controller 225 queries the environment model 230 and retrieves all the surfaces in the environment model 230 that are within a range of distance between $D_{max}$ and $D_{min}$ from the user position and within an angle $O_{max}$ and $O_{min}$ from the user orientation. The parameters $D_{max}$, $D_{min}$, $O_{max}$, $O_{min}$ are experimentally predetermined for a specific context or provided dynamically by an application.

Figure 4:
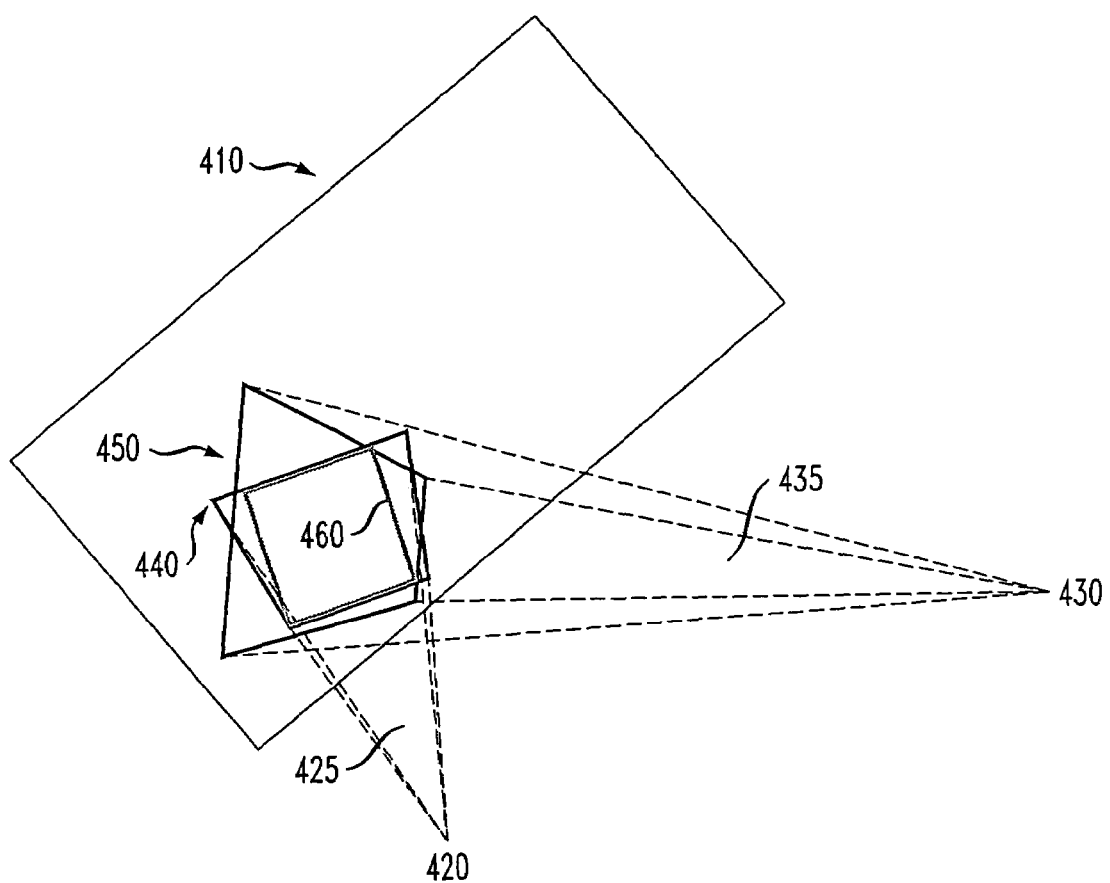
FIG. 4 is an illustration of the geometric reasoning for determining the display area on a selected surface, in accordance with one embodiment of the present invention.

In step 320, the user-following interface controller selects the surface closest to the user among the list of surfaces retrieved in step 310. In step 330, the user-following interface controller determines a display zone (also called the "display area") on the selected surface. Illustratively, this is done by geometric reasoning involving a) estimating the intersection of a rectangular viewing pyramid from the user position with the selected surface, which completely intersects the surface while minimizing the distance from the user to the center of the intersection area; b) finding the maximal coverage of the intersection area by the pyramid of projection from the projector; and c) finding the maximal rectangle within the coverage area that is aligned with the viewing pyramid of the user. This geometric reasoning is illustrated in FIG. 4, described below.

In step 340, the user-following interface controller 225 checks if the resultant display area is large enough for user viewing. This is done by verifying that the viewing angle for the user for the resulting display rectangle is greater than a minimum. If the display area does not pass the check in step 340, in step 370, the current surface is removed from the list of surfaces provided to step 320 and the process repeated from step 320. If the estimated display area passes the check in step 340, the orientation, pan, tilt, and zoom parameters of the projector are estimated in step 350. This is done based on the geometric reasoning performed in step 330, where the axis of projection and the viewing frustum of the projector are determined. The orientation of the axis, the distance from the center of projection to the selected display area, and the angle of the viewing frustum of the projector are mapped to the control parameters for the projector's pan, tilt, zoom and focus, based on a prior calibration of the projector.

Then, in step 360, the user-following interface controller 225 further verifies that the selected display area is not occluded by the user or other objects in the environment. This is done by verifying that a) the estimated viewing frustum of the projector does not intersect the bounding volume around the user; and b) that there is no surface in the environment model, other than the selected surface, that intersects the viewing frustum of the projector.

If the selected display area does not pass the occlusion check, then in step 370, the selected surface is removed from the list of surfaces provided to step 320 and the process repeated from step 310. This is described below in more detail in reference to FIG. 5.

If the selected display area does pass the occlusion check in step 360, then in step 380, the user-following interface controller estimates the projection pre-warping parameters in step 380. As explained earlier in the context of FIG. 2, the pre-warping parameters are used by the graphics controller 265 to pre-distort a projected image so that it appears undistorted to the user. In step 360, the user-following interface controller uses geometric reasoning to determine the mapping from the corners of the selected display area in step 330 to the corresponding points on the projector's image plane. This maps the rectangle on the display area to a quadrilateral on the projected image, which is typically not a rectangle. The user-following interface controller then computes the mathematical transformation or homography that maps the rectangle on the display area to its corresponding quadrilateral in the projected image plane. This mapping, when applied to an image that is to be projected, pre-distorts the image so that it appears undistorted to the user. The parameters of the computed mathematical transformation are the warping parameters 240 that are passed to the graphics controller. This is described in more detail in reference to FIG. 11, described below.

Next, in step 382, the user-following interface controller moves the projected interface to the desired position by sending control parameters 235 to the steerable projector. These are the pan, tilt, zoom, and focus parameters estimated in step 350.

In step 384, the user-following interface controller determines the interaction area corresponding to the display area selected in step 330. The interaction area is the area in which a user interacts with the projected interface. In the present embodiment, the user interacts with the projected image by means of their hand. As explained earlier in the context of FIG. 2, the interaction area may be identical to the display area, or may be different and fully overlapping, partially overlapping or not overlapping with the display area, depending on application constraints and the position of the user and the position of the camera used for detecting user interaction. In step 384, geometric reasoning and application specific constraints are used to determine the interaction area. Typically, this involves determining the maximal viewing rectangle aligned with the selected display area that is covered by the viewing frustum from the camera. This is determined using camera calibration parameters. If the resulting viewing rectangle is not large enough, the rectangle is moved on the surface containing the display area or to a different surface in the environment model that is close to the user and seen by the interaction detecting camera.

Next, in step 386, the user-following interface controller determines the image warping parameters corresponding to the interaction area. As explained earlier, the interaction detector 275 is provided with these warping parameters that can be used to map a representation of interaction widgets in a canonical orthogonal view to the view seen in the images 288 from the camera. The interaction detector 275 then performs analysis for interaction detection in the camera images 288. The computation of the image warping parameters in step 386 is similar to the computation of the projection pre-warping parameters in step 380. In this case, the corners of the interaction area selected in step 384 are mapped to the corresponding points on the image plane of the interaction detecting camera. This maps the rectangle on the interaction area to a quadrilateral on the camera image plane, which is typically not a rectangle. The user-following interface controller then computes the mathematical transformation or homography that maps the rectangle on the interaction area to its corresponding quadrilateral in the camera image plane. The parameters of the computed mathematical transformation are the warping parameters 250 that are passed to the interaction detector. This is described below in more detail in reference to FIG. 11.

In step 388, the user-following interface controller estimates the camera control parameters needed to move the interaction detecting steerable camera to view the interaction area selected in step 384. This is based on the geometric reasoning performed in step 384 along with the calibration data for the camera. The orientation of the axis of the camera for the selected interaction area, the distance from the optical center of the camera to the selected interaction area, and the angle of the viewing frustum of the camera are mapped to the control parameters for the camera's pan, tilt, zoom and focus. These control parameters 255 are passed to the camera.

Finally, in step 390 the user-following interface controller determines the user parameters 245 relative to the selected display and interaction areas and passes them onto the interface adapter. These parameters typically include the distance of the user, the viewing angle for the user, and the orientation of the user relative to the selected display and interaction areas.

The geometric reasoning, used in step 330 of FIG. 3, is illustrated in FIG. 4. FIG. 4 shows a selected surface 410. The corresponding user position is at 420 and the projector is at 430. The viewing pyramid for the user is indicated by 425 and the pyramid of projection of the projector by 435. The quadrilateral 440 indicates the intersection of the viewing pyramid of the user with the surface 410 that completely intersects the surface while minimizing the distance from the user to the center of the intersection area. The quadrilateral 450 indicates the intersection of the pyramid of projection from the projector with the selected surface 410. 460 is the maximal rectangle within the intersection of the quadrilaterals 440 and 450 that is aligned with the viewing pyramid of the user.

Figure 5:
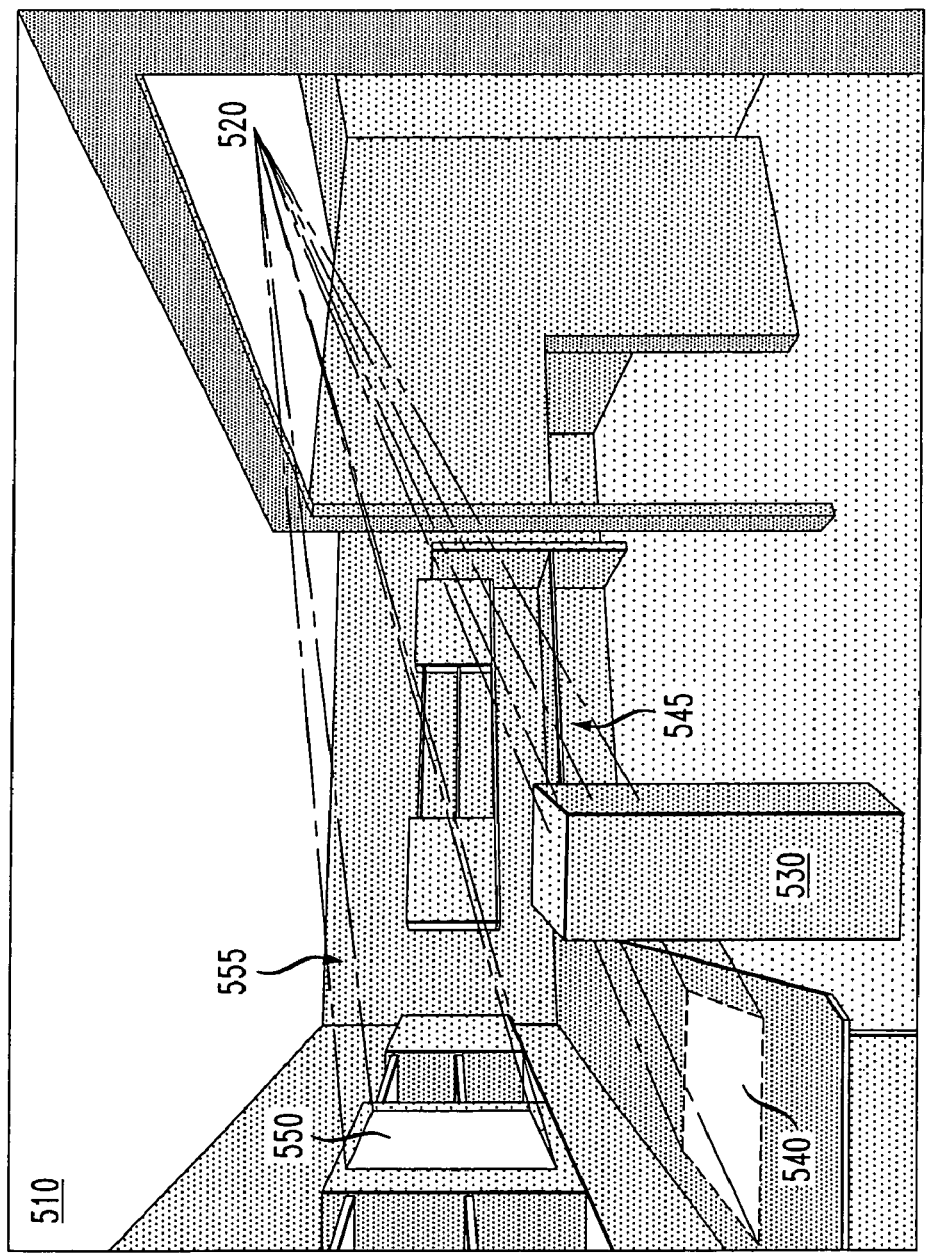
FIG. 5 is an illustration of the geometric reasoning for selecting a non-occluded display area, in accordance with one embodiment of the present invention.

FIG. 5 helps to illustrate steps of method 300 described above. It is helpful to refer to FIG. 3 during the description of FIG. 5. An example of an occlusion check is illustrated in FIG. 5, which shows a model 510 of an environment along with a projector location 520 and the bounding volume 530 around the position of the user, and a selected display area 540. In step 360 of FIG. 3, an occlusion check is made. The user-following interface controller 225 determines through geometric reasoning that the viewing pyramid 545 from the projector location 520 to the display area 540 is occluded by the user bounding box 530. If the selected display area does not pass the occlusion check, then in step 370, described above, the selected surface is removed from the list of surfaces provided to step 320 and the process repeated from step 310. In FIG. 5, for example, the display area 540 does not pass the occlusion check, and the user-following interface controller selects display area 550 which passes the occlusion check and is close to the user. In particular, the viewing pyramid 555 from the projector location 520 to the display area 550 is not occluded by the user bounding box 530.

Figure 6:
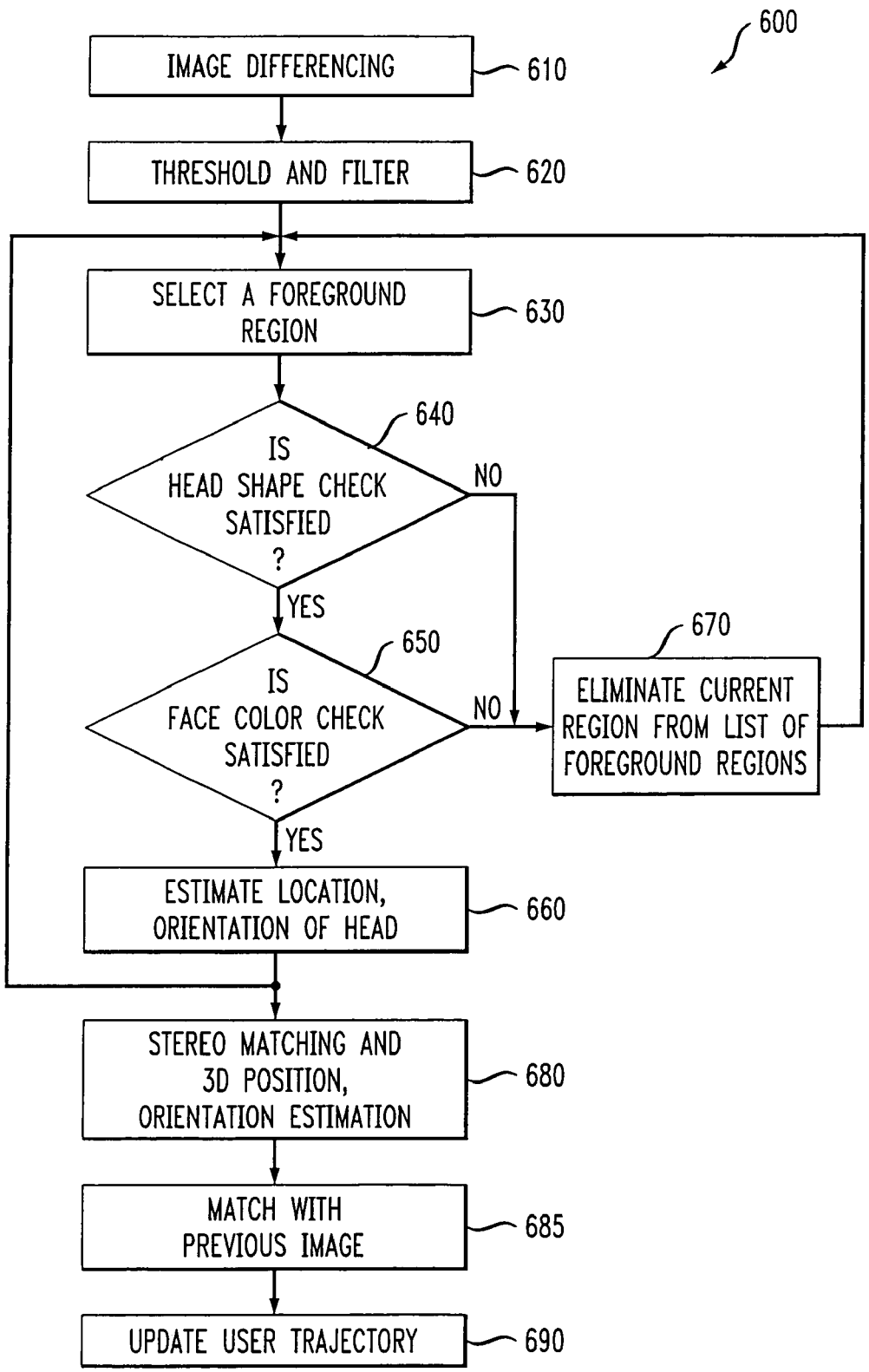
FIG. 6 is a flow chart of a method for analyzing camera images in one embodiment of a user tracking module, in accordance with one embodiment of the present invention.

FIG. 6 shows a flowchart of a method 600 implemented, illustratively, by the user tracking module 210 from FIG. 2. Method 600 tracks a user. As indicated in FIG. 2, images from multiple cameras are processed by the user tracking module to yield the position and orientation of the user. FIG. 6 illustrates exemplary steps involved in processing images from one camera. Similar processing occurs in camera images from the remaining cameras. The results from these multiple analyses is merged in step 680 as explained shortly.

Step 610 computes the difference between two consecutive images in the incoming image sequence 605 from a camera. Alternatively, step 610 can compute the difference image between the current image from the camera and an estimated "background image" of the observed scene. The resulting difference image is then thresholded and filtered in step 620 to yield a set of "foreground" regions produced by new objects moving into the scene. Step 620 produces a list of detected foreground regions that is provided to step 630. Then in step 630, one of these regions is selected for further analysis. Initially, the selection is driven merely by size constraints. Once tracking commences, the selection is driven by the head detection parameters 665 from the previous image. In this case, the selection in step 630 involves searching for the region that is close in position, size and shape to the region corresponding to a head detection in the previous image.

Step 640 then involves checking if the selected region satisfies a head-shape check. Illustratively, this step involves analyzing the bounding contour of the region, and checking if there exist two prominent concavities with a convexity between them corresponding to shoulders and a head in between them. Next, it is verified that the bounding contour corresponding to the head region is close in shape to an ellipse. If these checks are not met, step 670 removes the region from the list of foreground regions, and the process is repeated from step 630. If the head shape check is met in step 640, step 650 checks if there is sufficient flesh tone color in the selected region. If this check is also met, then step 660 estimates the location size, shape, and intensity distribution for the detected head region and passes on these head detection parameters 665 to step 680 and to step 630 for the subsequent image. Step 660 also estimates the orientation of the head, or the pan and tilt parameters of the head with respect to the optical axis of the camera.

Step 680 combines the head detection parameters from multiple cameras observing the scene at the same time. Step 680 first matches the parameters, particularly the shape and color distribution of the detected head regions from the different cameras. For the matching head regions from the multiple cameras, step 680 performs stereo using the calibration parameters of the different cameras and obtains the best estimate for the three-dimensional (3D) position of the head. Similarly, step 680 combines the estimates of head pan and tilt with respect to individual cameras to estimate the 3D orientation of the head. In step 685, this head position and orientation is matched with the corresponding estimates in the previous image, and the resulting match is then used to update the trajectory of a user in step 690. Step 690 produces the user tracking module outputs on user position, orientation and trajectory. An example of a tracked user is shown in reference to FIG. 10.

Figure 7:
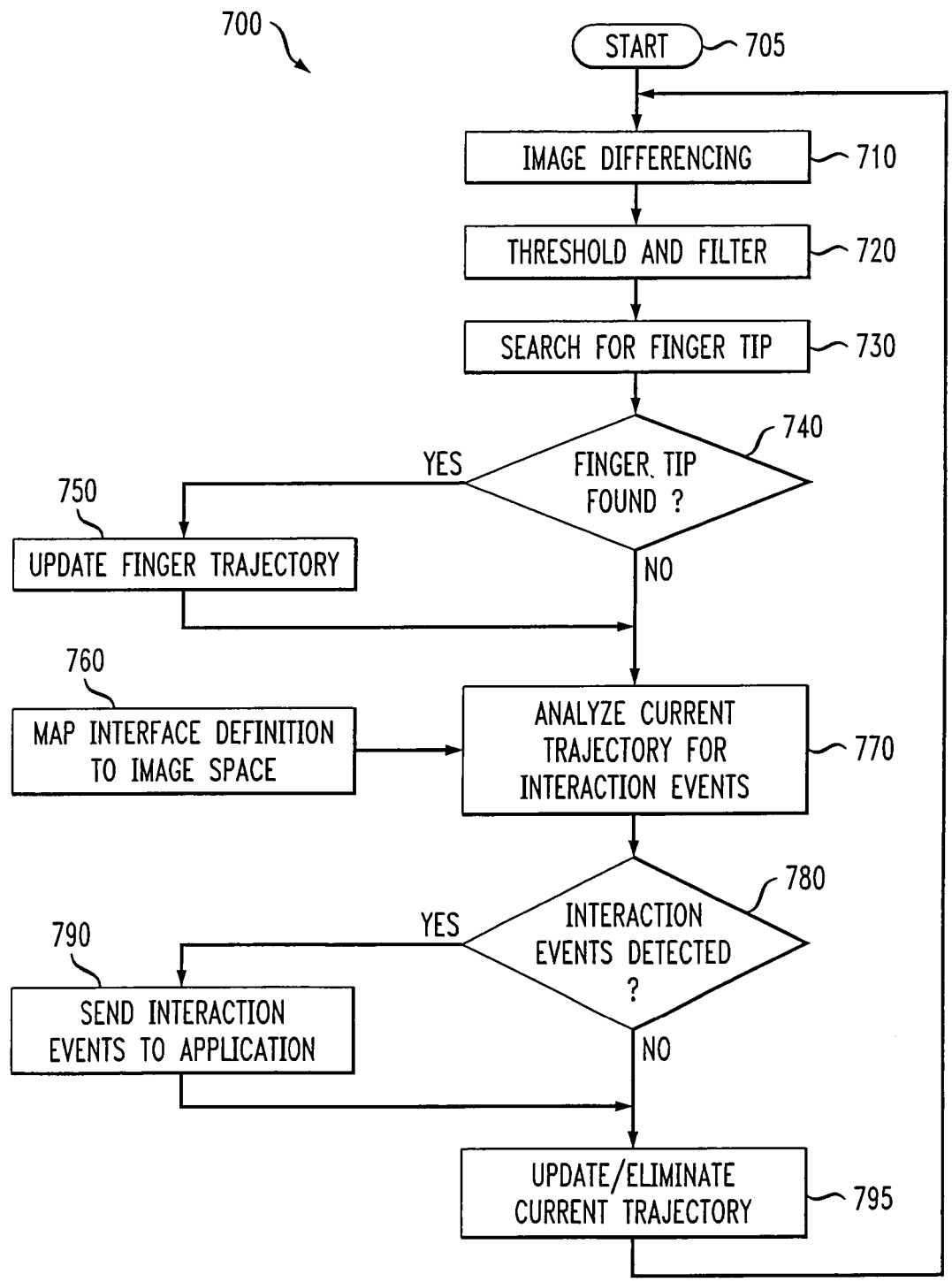
FIG. 7 is a flow chart of a method for determining user interaction with a displayed image, in accordance with one embodiment of the present invention.

FIG. 7 shows a flowchart of a method 700 for tracking interaction from a user. Method 700 is generally executed by, for example, the interaction detector module 275 from FIG. 2. As indicated in FIG. 2, and in reference to FIG. 7, the inputs to the interaction detector module 275 are camera images 288 from a steerable camera, an interface definition 286, and warping parameters 250. These inputs are provided to the method in step 705. The outputs of the interaction detector are interaction events 292, which are sent to the application. In this embodiment of the interaction detector module 275 and method 700, it is assumed that the user interacts with the interface by means of their finger. However, the user may interact with the interface through any device, such as a laser pointer, or through any body part.

Step 710 computes the difference between two consecutive images in the incoming camera images 288 from the steerable camera. The resulting difference image is then thresholded and filtered in step 720 to yield a set of "foreground" regions produced by new objects moving into the scene. Then in step 730, the interaction detector searches the foreground regions for a finger tip. This is done by searching each foreground region for a possible match with a precomputed template of a finger tip. In step 740, the interaction detector checks if a finger tip has been found by verifying if there is an acceptable match between the finger tip template and one of the foreground regions. If a match is found, the trajectory of the finger tip, derived from finger tip detection in previous images, is updated with the detection from the current image. If no current trajectory exists, a new trajectory is created in step 750.

Next, in step 770, the current trajectory is analyzed for interaction events. In order to determine interaction events, the interaction detector requires a definition of the interface in image space. The interface definition includes the specification of the position, shape, and size of interaction regions or widgets in an image, and a specification of the event to be detected—for example, a widget selection resulting from a user moving his or her finger tip into the widget region, and then stopping or withdrawing. Since the interface definition 286 is in application space, this definition has to be mapped into image space to support the analysis in step 770. This is done in step 760, where the interface definition 286, together with the warping parameters 250 provided by the user-following interface controller, is used to map the interface definition from application space to image space. After the analysis in step 770, step 780 checks if there are any detected interaction events. If so, step 790 sends the interaction events to the application by packaging and transmitting the event in the appropriate format.

Next, step 795 updates or eliminates the current trajectory as needed. For instance, if no finger tip was found in step 740 and a current finger tip trajectory exists from detections in previous frames, this existing trajectory is eliminated in step 795 so that a fresh trajectory is begun in the next round of processing. As seen in FIG. 7, after step 795 a new round of processing begins with step 710.

As described earlier, the content of the interface may also be varied based on the user position. For example, if the user is on the right of a large displayed image of a video player application, the interaction buttons such as "play" and "rewind" should be on the right hand side of the displayed image to be accessible by the user. On the other hand, if the user is on the left hand side, the buttons should also be on the left hand side. The number of buttons and the size of the text on a button may also have to be changed based on user position. The user-following interface system of FIG. 2 has an interface adapter module 270 that dynamically changes the actual interface content.

Figure 8:
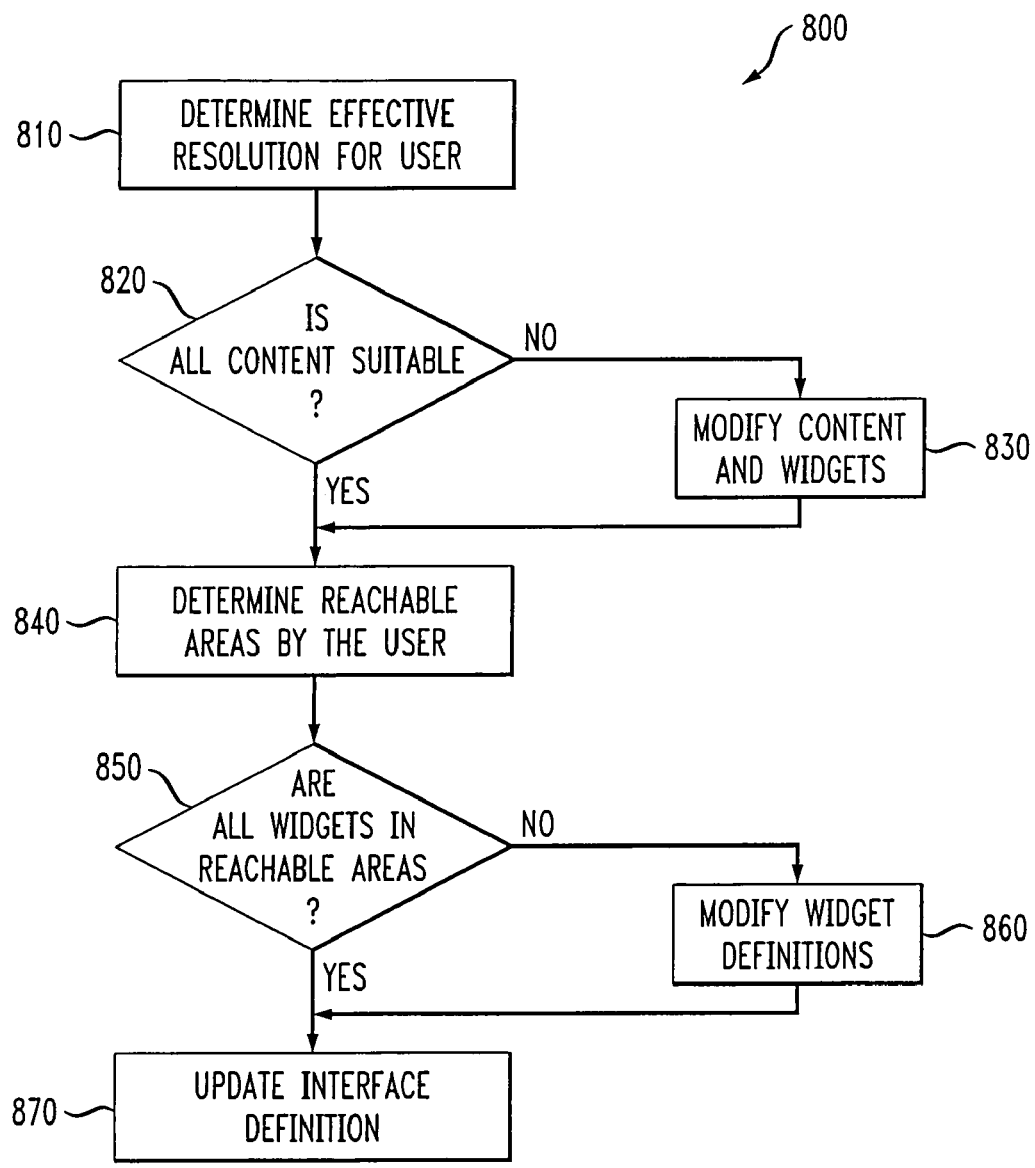
FIG. 8 is a flow chart of a method for modifying a displayed image, in accordance with one embodiment of the present invention.

FIG. 8 shows an exemplary embodiment of a method 800 for modifying content size and widgets. Method 800 is usually performed, for instance, by an interface adapter module 270. The interface adapter module 270 receives an interface definition 290 from an application. The interface definition 290 provides the interaction widgets and their canonical views and locations. These are generally application-specific. The interface definition 290 may also include a set of alternate definitions that the interface adapter module 270 can choose from. The interface adapter module 270 receives user parameters 245 that specify the user distance from the displayed image, the orientation of the user with respect to the displayed image, and the size of the hand of the user as seen in the camera images 288. These parameters 245 are provided to the interface adapter module 270 by the user-following interface controller 225.

In step 810, the interface adapter module 270 determines the effective resolution of the displayed image with respect to the user. This is done by determining the viewing angle subtended by the user over the display area using the parameters 245 and then using the interface definition 290 to determine the number of pixels in the displayed image. The adapter determines the number of unit viewing angles per pixel based on the distance of the user from the displayed image, the size of the displayed image and the number of pixels per displayed image. If the effective resolution measured as the number of unit angles available per pixel is low, the visibility or readability of the displayed image to the user is poor.

In step 820, the interface adapter module 270 verifies if all the display content in the interface definition is suitable for viewing by the user at the effective resolution determined in step 810. If the content is unsuitable such as the font being too small to be readable at the effective resolution, or the thickness of a line or the size of an interaction widget being too small, in step 830, the interface adapter module 270 modifies the content and widgets to suit the effective resolution. This is typically done based on alternate interface choices or policies provided by an application. For example, the application may specify a set of alternate choices for the display content such as 1) "Sale" 2) "Sale for $5.99 on X", and 3) "Sale items: A $3.99, D $10.99, X $5.99, Y $8.99; Select your choice". In this example, the interface adapter module 270 selects one of these options based on the effective resolution. Thus, when the user is far away, he only sees a large displayed image with the message "Sale", and as he comes closer to the displayed image, the second message appears highlighting one of the sale items, and finally when the user is close enough, a detailed message appears offering a list of sale items and the option of selecting one of the items for more information.

In step 840, the interface adapter module 270 determines if the interaction areas specified in the current interface definition are reachable by the user. Initially, the interaction areas are placed at the location specified by the default definition of the interface. Based on the user parameters 245, the interface adapter module 270 determines if each widget that the user has to interact with hand is reachable by the user and whether it gets occluded during user interaction. For example, these widgets may be "play," "pause," "forward," and "rewind" buttons in a video player application. In step 850, the interface adapter module 270 verifies if all interaction areas or widgets are reachable. If not, in step 860, the interface modifies the widget definitions so that they are reachable by the user. For example, the buttons in a video player application may move to the right side of a displayed image, if the user is on the right and to the left side of the displayed image if the user is on the left to ensure that these interaction buttons are reachable by the user.

In step 870, the interface adapter module 270 updates the interface definition based on the changes made in steps 830 and 860, and outputs the updated display content definition 284 to the graphics controller 265, and outputs the updated interaction widget definition 286 to the interaction detector 275.

FIG. 9 shows an example of a three-dimensional model of an environment 910 with several defined display areas 915, 920, 925, 930, 935, 940, 945, 950, 955, 960, 965, 970, 975. An environment model 230 can be determined from the environment 910, and such a model 230 will include descriptions of display areas 915, 920, 925, 930, 935, 940, 945, 950, 955, 960, 965, 970, 975 along with descriptions of any potentially occluding permanent or movable structures.

Figure 10:
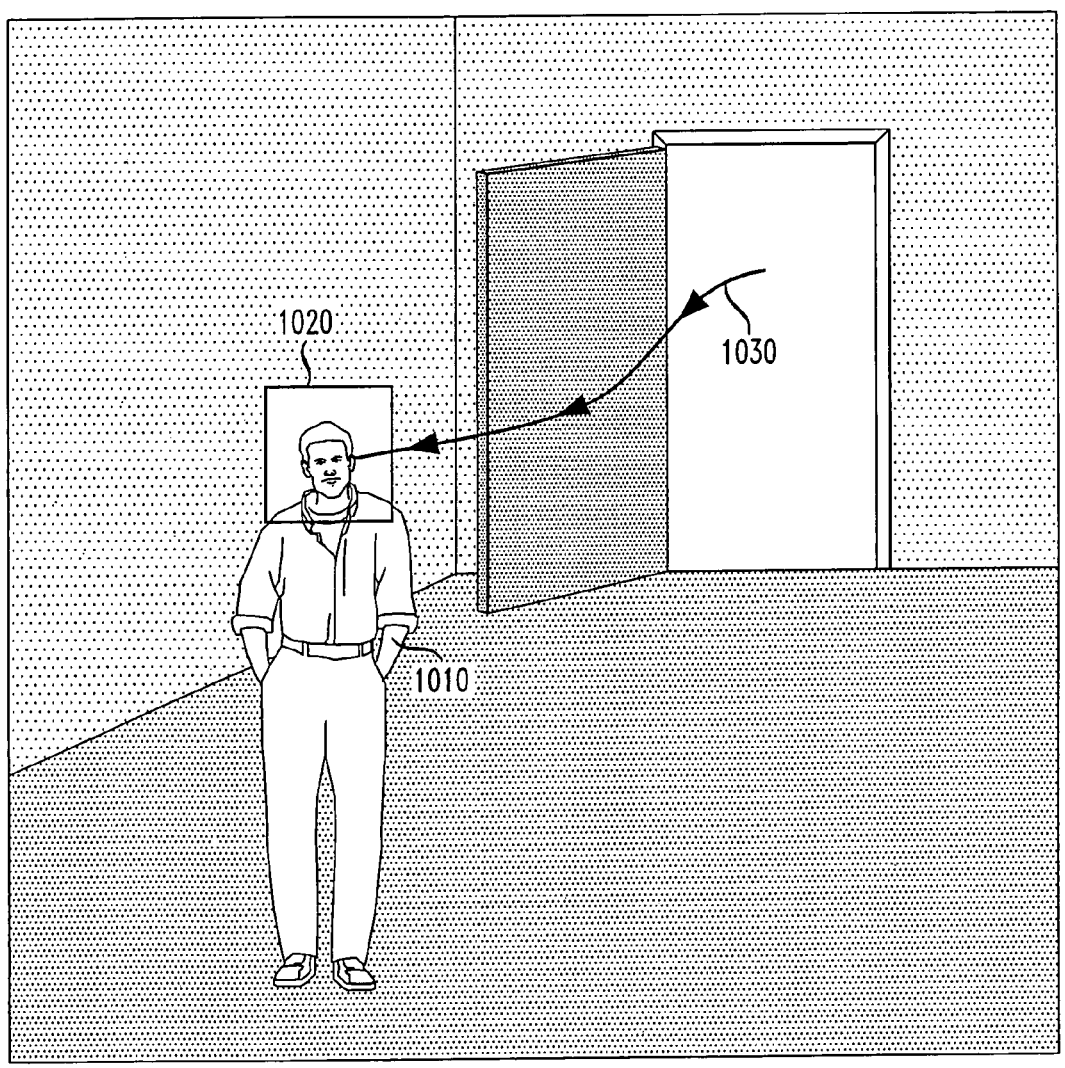
FIG. 10 is an illustration of tracking of an individual in a camera image, in accordance with one embodiment of the present invention.

FIG. 10 shows an example of a user trajectory estimated from images from one camera. Such an analysis is provided by step 690 of method 600 of FIG. 6. FIG. 10 indicates a user 1010, the detected head region 1020 in the current image, and the trajectory 1030 resulting from matches of head positions over successive images.

Figure 11:
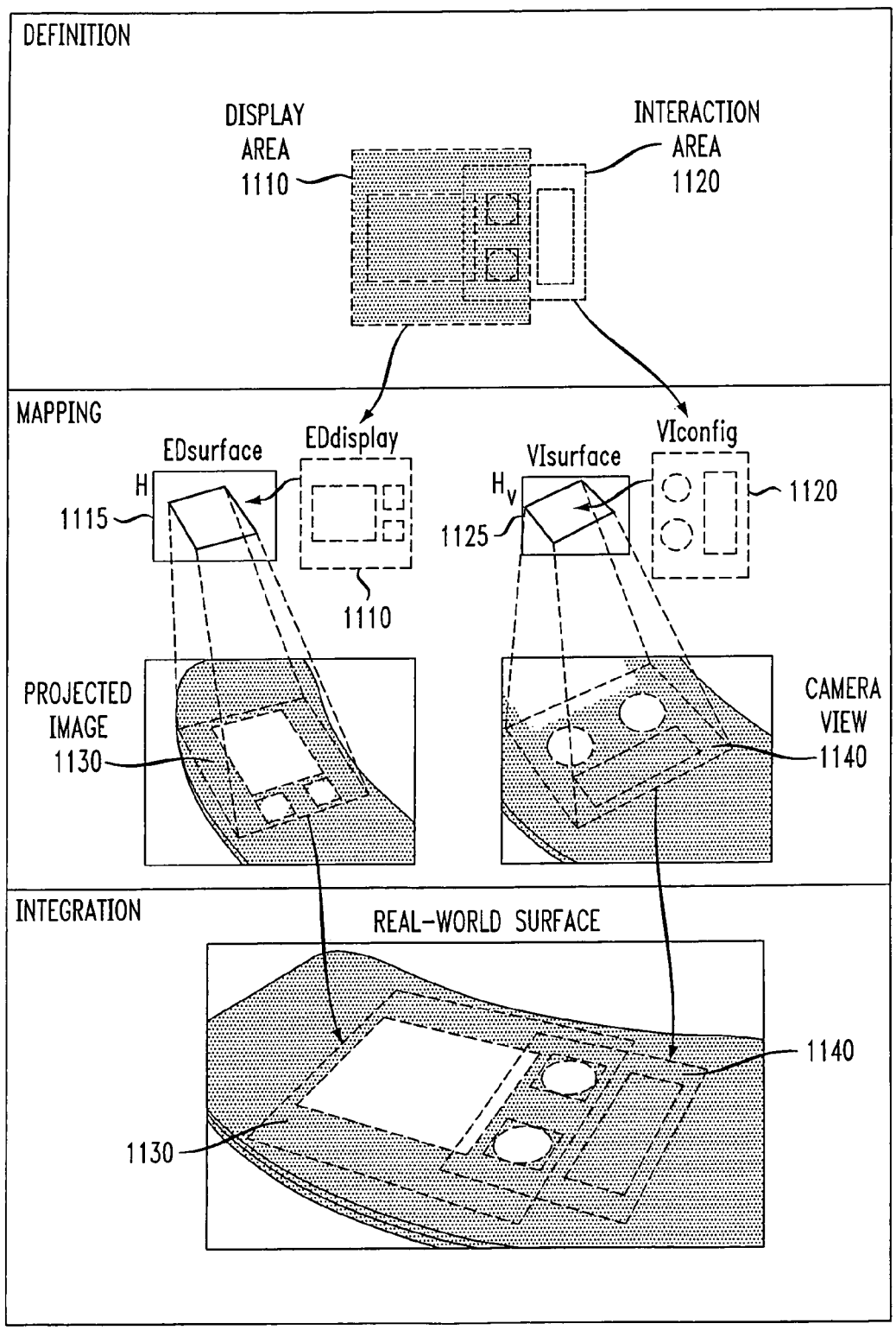
FIG. 11 is an illustration of the mapping of defined display and interaction areas from application space to real space, in accordance with one embodiment of the present invention.

FIG. 11 illustrates the mapping of display and interaction areas from application space to real space, such as the mapping performed in steps 360 and 380, respectively, of FIG. 6. Display area 1110 is a display area definition in application space, H is the homography for the selected surface, and H pre-warps the display area 1110 to a distorted image 1115. This image when projected by the projector appears as a display area 1130 on the selected display area. The displayed image in the display area 1130 will be substantially undistorted when viewed by a user. FIG. 11 further illustrates the mapping of an interaction area from application space to real space. Interaction area 1120 is an interaction area definition in application space, $H_v$ is the homography for the selected surface, and $H_v$ pre-warps the interaction area 1120 to the image 1125 seen by the camera. This image 1125 is what the camera sees corresponding to the interaction area 1140 on the selected surface in real space.

It is to be understood that the embodiments and variations shown and described herein are merely illustrative of the principles of this invention and that various modifications may be implemented by those skilled in the art without departing from the scope and spirit of the invention.

What is claimed is:

1. A user-following interface system comprising:
   one or more projectors adapted to project one or more images onto one or more selected surfaces in a real environment, wherein the one or more selected surfaces are selected from a plurality of surfaces;
   a user tracking module adapted to track positions of one or more users in the environment; and
   a controller coupled to the one or more projectors and the user tracking module, the controller adapted to select the one or more surfaces based on the positions of the one or more users in the real environment, and to provide information to the one or more projectors suitable for allowing the one or more projectors to project the one or more images onto the one or more selected surfaces, wherein a selected surface comprises a display area and wherein the controller is further adapted to select a display area for an image by:
   mapping the position and orientation of a selected user into a three-dimensional environment model;
   determining a volume, in the three-dimensional model, that is viewable by the selected user;

determining a set of displayable surfaces in the viewable volume;
available display areas on each surface;
determining a distance from a head of the selected user to a center of an available display area;
eliminating available display areas that are occluded by the user to create remaining display areas; and
selecting one of the remaining display areas, within the viewable volume, that is closest to the selected user while being approximately orthogonal to a viewing direction of the selected user.

2. The user-following interface system of claim 1, wherein the user tracking module is coupled to one or more tracking devices, wherein the user tracking module is further adapted to track orientations of the one or more users by using information from the one or more tracking devices, and wherein the controller is further adapted to select the one or more surfaces based on the orientations of the one or more users.

3. The user-following interface system of claim 1, further comprising a model of the real environment, wherein the controller is coupled to the model and is adapted to access, from the model, information about surfaces and objects in the real environment.

4. The user-following interface system of claim 1, wherein the controller is further adapted to identify occlusion of a projected image.

5. The user-following interface system of claim 4, wherein the controller is further adapted to move the projected image to a surface that is not occluded.

6. The user-following interface system of claim 1, wherein the controller is further adapted to determine warping parameters to prewarp an image to ensure it appears substantially undistorted to a user when the image is displayed on a selected surface.

7. The user-following interface system of claim 1, wherein the controller is further adapted to determine an orientation of a selected image when displayed on a selected surface, and to provide information to the one or more projectors so that the selected image, when displayed on a selective surface, looks upright and approximately orthogonal to a selected user.

8. The user-following interface system of claim 1, wherein the controller is further adapted to determine a size of a projected image based on an available area on a display area and on a distance of the display area from a selected user.

9. The user following interface system of claim 1, wherein the user tracking module is coupled to one or more tracking devices, and wherein at least one of the tracking devices comprises one or more cameras that observe one or more of the users in the real environment.

10. The user-following interface system of claim 9, wherein the user tracking module is coupled to one or more tracking devices, and wherein user tracking module is further adapted to analyze camera images from the one or more cameras for one or more of motion, shape, and color to determine presence of people in each camera image.

11. The user-following interface system of claim 9, wherein the user tracking module is further adapted to combine a detected location of an individual in multiple camera images and calibration parameters of the cameras to yield a three-dimensional location of the individual in the real environment.

12. The user-following interface system of claim 1, wherein the user tracking module is coupled to one or more tracking devices, and wherein at least one of the tracking devices comprises an electromagnetic device or an active badge worn by at least one user.

13. The user-following interface system of claim 1, wherein the user tracking module is coupled to one or more tracking devices, wherein the at least one tracking device is further adapted, when analyzing the camera images, to:
find a difference between a current image from a selected camera and a previous image from the selected camera to creating a difference image;
threshold and filter the difference image to remove noise and to yield foreground regions;
select foreground regions with sufficient human skin color;
search the selected foreground regions for a shape of a human head; and
determining a position of the head in the difference image.

14. The user-following interface system of claim 13, wherein the at least one tacking device is further adapted to analyze a detected head shape in a camera image to determine an orientation of the detected bead shape, thereby determining which way a selected user is facing.

15. The user-following interface system of claim 1, further comprising a sensing mechanism adapted to detect user interactions with a selected image projected onto one of the selected surfaces.

16. The user-following interface system of claim 15, wherein the sensing mechanism comprises a camera adapted to observe the selected image.

17. The user-following interface system of claim 15, wherein the sensing mechanism is further adapted to detect user hand gesture interactions with the selected image, and wherein the sensing mechanism is further adapted to detect a variety of interaction modes resulting from the user hand gesture interactions.

18. The user-following interface system of claim 15, wherein the sensing mechanism is further adapted to detect user interaction when the user uses a laser pointing device.

19. The user-following interface system of claim 15, wherein an interaction area, comprising a first image, is independent of a display area, comprising a second image, wherein the interaction area and display area are completely separate, completely overlapping, or partially overlapping.

20. The user-following interface system of claim 15, wherein a configuration is defined by a user or application in application space and where the controller is further adapted to automatically determine a view by a camera of the configuration for any surface that a selected image is projected on, so that no separate configurations for each camera view need to be defined.

21. The user-following interface system of claim 15, wherein the controller is further adapted to select an interaction area for an image by:
mapping position and orientation of the user into a three-dimensional environment model;
determining a volume in the three-dimensional model that is reachable by the user;
determining a set of surfaces available for interaction in the reachable volume;
determining available interaction areas on each surface;
determining a distance from an appendage of the user to a center of an available interaction area;
eliminating interaction areas that are occluded by the user to create remaining interaction areas; and
selecting one of the remaining interaction areas, within the reachable volume, that is closest to the user while being approximately orthogonal to a viewing direction of the user.

22. The user-following interface system of claim 15, wherein the controller determines warping parameters that map an interaction area to a camera image of the interaction area.

23. The user-following interface system of claim 1, further comprising an interface adapter adapted to change content of the one or more images based on user and surface parameters.

24. The user-following interface system of claim 23, wherein the interface adapter is further adapted to determine an effective resolution of the one or more images with respect to a user.

25. The user-following interface system of claim 23, wherein the interface adapter is further adapted to change content of the one or more images to be visible arid readable by the user.

26. The user-following interface system of claim 23, wherein the interface adapter is further adapted to modify one or more of size or position of interaction widgets in the one more images based on user position and orientation parameters.

27. The user-following interface system of claim 23, wherein the interface adapter is further adapted to modify a mode of interaction based on user position and orientation parameters.

28. The user-following interface system of claim 23, wherein the interface adapter is further adapted to modify parameters of one or more interaction sensing mechanisms based on user position and orientation parameters.

* * * * *